(12) United States Patent
Lius et al.

(10) Patent No.: US 12,087,083 B2
(45) Date of Patent: *Sep. 10, 2024

(54) DISPLAY DEVICE AND ELECTRONIC DEVICE

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,934

(22) Filed: Apr. 10, 2023

(65) Prior Publication Data

US 2023/0260317 A1    Aug. 17, 2023

Related U.S. Application Data

(63) Continuation of application No. 17/567,163, filed on Jan. 3, 2022, now Pat. No. 11,651,617, which is a continuation of application No. 16/921,972, filed on Jul. 7, 2020, now Pat. No. 11,238,263.

(30) Foreign Application Priority Data

Aug. 6, 2019    (CN) .......................... 201910723185.1

(51) Int. Cl.
  *G06V 40/13*    (2022.01)
  *G09G 3/20*    (2006.01)
  *G09G 3/3208*    (2016.01)

(52) U.S. Cl.
  CPC ....... *G06V 40/1318* (2022.01); *G09G 3/2003* (2013.01); *G09G 3/3208* (2013.01); *G09G 2320/043* (2013.01)

(58) Field of Classification Search
  CPC ............ G06V 40/1318; G09G 3/2003; G09G 3/3208; G09G 2320/043; G09G 2300/0452

See application file for complete search history.

(56) References Cited

U.S. PATENT DOCUMENTS

| 11,238,263 | B2* | 2/2022 | Lius ................... G09G 3/3208 |
| 11,651,617 | B2* | 5/2023 | Lius ................... G09G 3/2003 |
| | | | 345/694 |
| 2009/0201400 | A1 | 8/2009 | Zhang |
| 2018/0151639 | A1* | 5/2018 | Luo ..................... H10K 59/60 |
| 2018/0165496 | A1 | 6/2018 | Cheng |
| 2019/0294849 | A1* | 9/2019 | Ma ..................... G06V 40/1318 |
| 2020/0083302 | A1* | 3/2020 | Park ..................... H10K 59/126 |

FOREIGN PATENT DOCUMENTS

CN    108182872 A    6/2018

* cited by examiner

*Primary Examiner* — Stephen G Sherman
(74) *Attorney, Agent, or Firm* — Winston Hsu

(57) ABSTRACT

The present disclosure provides a display device and an electronic device. The electronic device includes a substrate, a first circuitry, a first light emitting unit, a sensor circuitry, and a sensor unit. The first circuitry, the first light emitting unit, the sensor circuitry and the sensor unit are disposed on the substrate. The first light emitting unit is driven by the first circuitry. The sensor unit is driven by the sensor circuitry. A first portion of the sensor circuitry is overlapped with the first light emitting unit and a second portion of the sensor circuitry is overlapped with the sensor unit in a top view direction of the electronic device.

11 Claims, 12 Drawing Sheets

DISPLAY DEVICE AND ELECTRONIC DEVICE

CROSS REFERENCE TO RELATED APPLICATIONS

This application is a continuation application of U.S. application Ser. No. 17/567,163, filed on Jan. 3, 2022, which is a continuation application of U.S. application Ser. No. 16/921,972, filed on Jul. 7, 2020. The contents of these applications are incorporated herein by reference.

BACKGROUND OF THE DISCLOSURE

1. Field of the Disclosure

The present disclosure is related to a display device and an electronic device including sensors, and more particularly, to a display device and an electronic device including fingerprint sensors.

2. Description of the Prior Art

In general, fingerprint identification can be used to identify personal identity. Fingerprint identification has been integrated into electronic devices and widely used with the development of the technology of electronic device. Users can directly access the electronic device through the fingerprint identification without memorizing passwords. Moreover, fingerprint identification can provide better convenience or security since the process of fingerprint identification is fast and the fingerprint is difficult to counterfeit. In recent years, the industry is committed to integrating the fingerprint sensing function and the display function into the electronic device that can display high-resolution images. The sensing technology can not only be applied to fingerprint identification, but also has applications such as image sensing or touch sensing.

SUMMARY OF THE DISCLOSURE

To solve the above technical problem, one of the objectives of the present disclosure is to provide an electronic device including a substrate, a first circuitry, a first light emitting unit, a sensor circuitry, and a sensor unit. The first circuitry, the first light emitting unit, the sensor circuitry and the sensor unit are disposed on the substrate. The first light emitting unit is driven by the first circuitry. The sensor unit is driven by the sensor circuitry. A first portion of the sensor circuitry is overlapped with the first light emitting unit and a second portion of the sensor circuitry is overlapped with the sensor unit in a top view direction of the electronic device.

These and other objectives of the present disclosure will no doubt become obvious to those of ordinary skill in the art after reading the following detailed description of the embodiment that is illustrated in the various figures and drawings.

DETAILED DESCRIPTION

Figure 1:
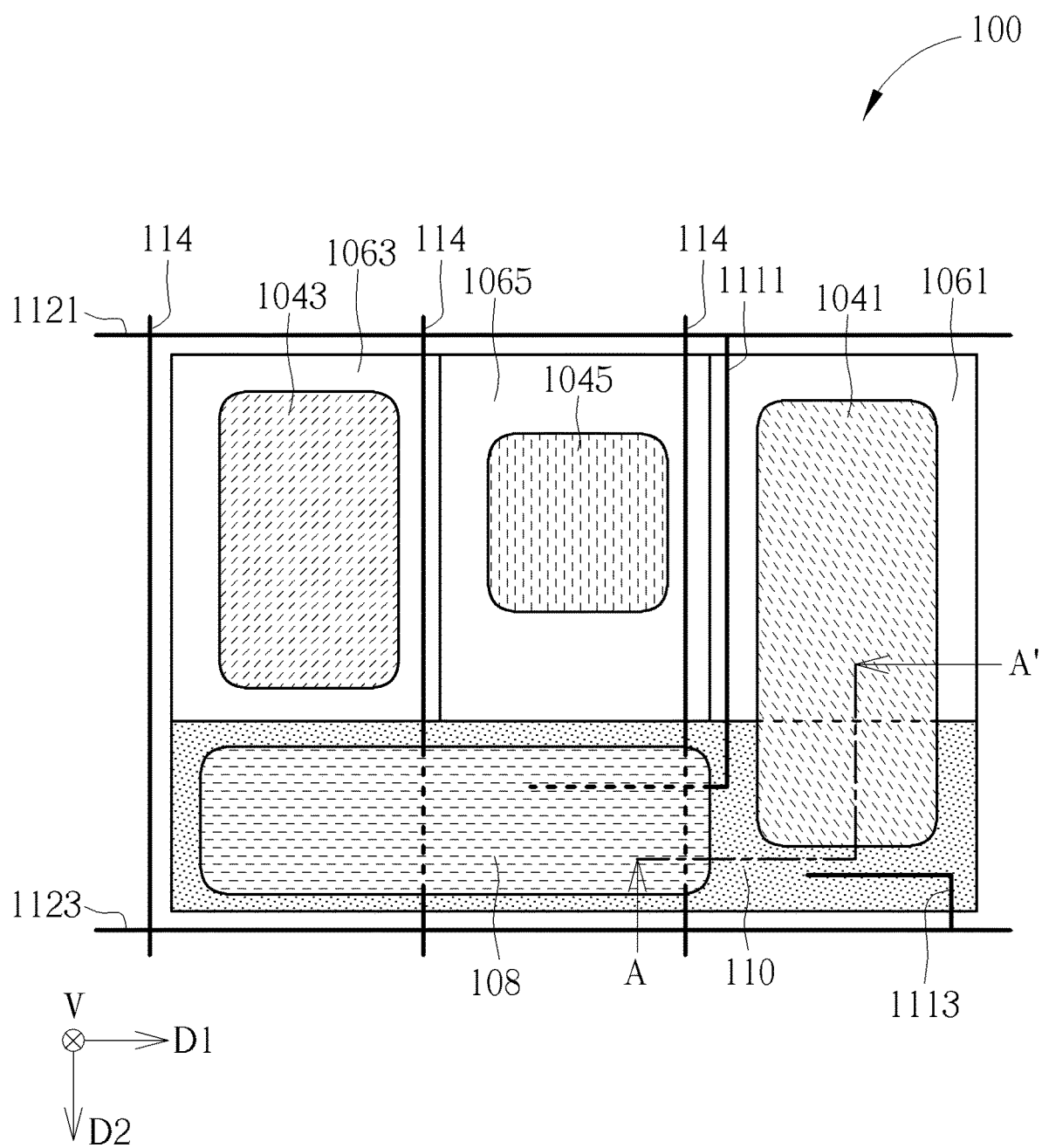
FIG. 1 is a schematic diagram illustrating a display device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device or a tiled device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

The electrical connection may include direct connection or indirect connection. The electrical connection between two components can be achieved by directly contacting in order to transmit electrical signals, and there are no other components between the two components. The electrical connection of two components can also be bridged through the component intermediary between the two components to transmit electrical signals. Electrical connection can also be called as coupling.

The term "about", "substantially", "equal", or "same" generally refers to falling within 20% of a given value or range, or to falling within 10%, 5%, 3%, 2%, 1%, or 0.5% of a given value or range.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

An electronic device of the present disclosure may include a display device, an antenna device, or a tiled device, but not limited thereto. The electronic device may be a bendable or flexible electronic device. The electronic device may be a display device having a touch function, an image sensing function, various types of parameter sensing functions, or a fingerprint identification function. The display device may be a self-luminous display, such as organic light emitting diode (OLED) display, inorganic light emitting diode display (LED), mini light emitting diode (mini LED, millimeter sized LED) display, micro light emitting diode (micro-LED, micrometer sized LED) display, quantum dot (QD) material display (including, for example, quantum dot light emitting diode (QLED, QDLED)), fluorescence material display, phosphor material display, or other suitable displays, or any combination of the above displays, but not limited thereto. The concept or principle of the present disclosure can also be applied to a non-self-luminous liquid crystal display (LCD), but not limited thereto. The embodiments of the present disclosure take an electronic device including a self-luminous light emitting diode display as an example, but not limited thereto.

The antenna device may include, for example, a liquid crystal antenna or other types of antennas, but not limited thereto. The tiled device may be, for example but not limited to, a display tiled device, an antenna tiled device, or a combination thereof. It should be noted that the electronic device can be any combination of the above devices, but not limited thereto. In addition, the appearance of the electronic device may be rectangular, circular, polygonal, a shape with curved edges, or other suitable shapes. The electronic device may have peripheral systems such as a drive system, a control system, a light source system, a shelf system, etc. to support the display device, the antenna device, or the tiled device. Hereinafter, the display device is used as the electronic device to explain the present disclosure, but the present disclosure is not limited thereto. If the electronic device is an antenna device or other devices, its minimum working unit can be equivalent to the pixel unit of the display device.

The sensors in the present disclosure can be applied to sensing applications such as light, heat, pressure, electromagnetic force, vibration, sound, gravity, ultrasonic wave, length, image, touch control, or fingerprint identification, and are not limited to specific functions. The embodiments of the present disclosure take fingerprint identification sensing as an example, but not limited thereto.

A pixel unit in a display device may include a plurality of sub-pixels disposed side by side with each other. In one embodiment, the sub-pixels in the display device may include green, red, and blue sub-pixels, or green, red, blue, and yellow sub-pixels, or green, red, blue, and white sub-pixels, and these different colors of lights generated by the sub-pixels can be used to display color images, but not limited thereto. The color of light provided by the sub-pixels can be designed according to requirements. In another embodiment, the display device may be a monochrome display device, in which all sub-pixels may emit light of a single color, such as white, red, or any suitable color. In addition, the shape of the sub-pixel in the top view may include rectangle, parallelogram, ">"-shape, or any suitable shape.

Figure 2:
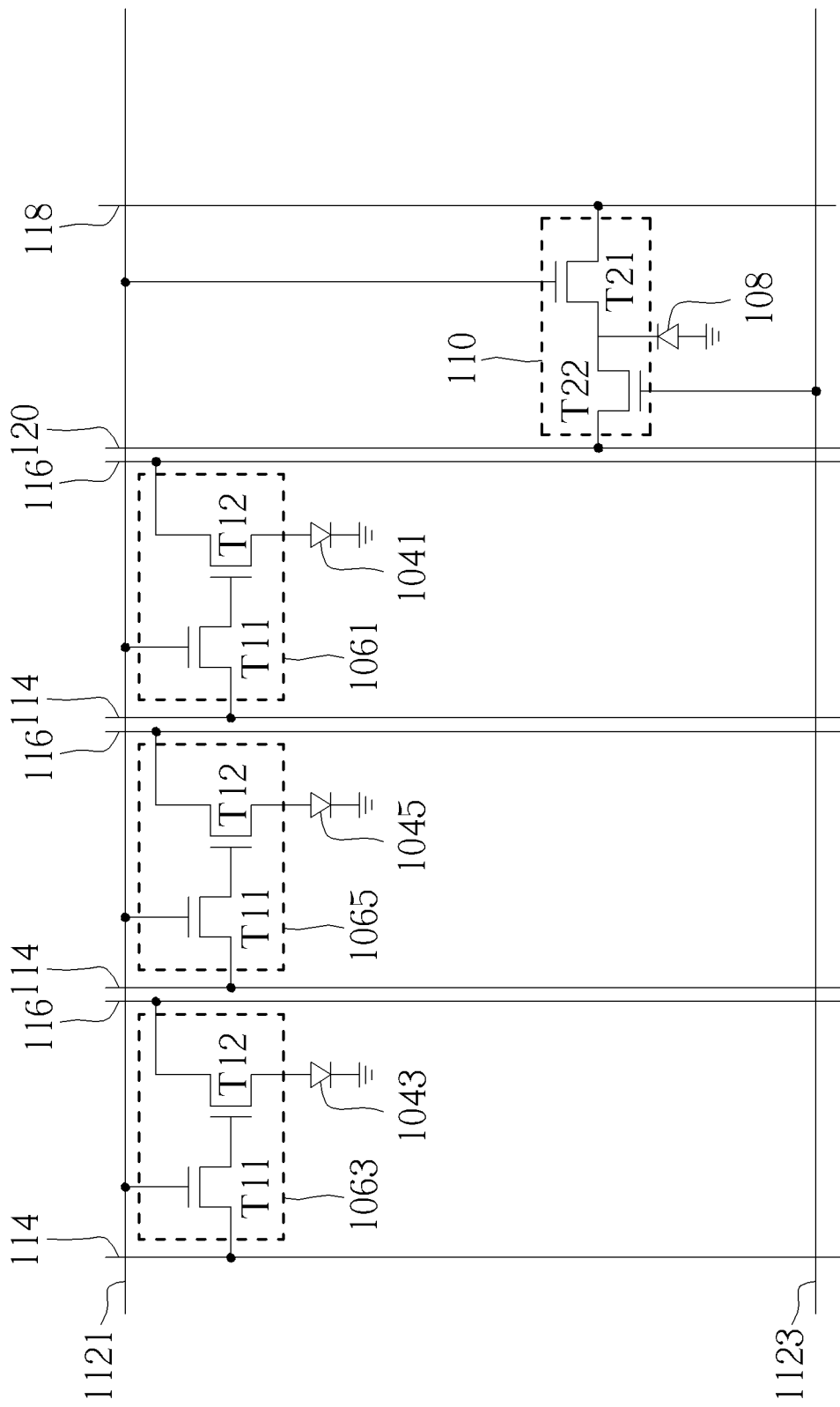
FIG. 2 is a circuit diagram of the display device in FIG. 1.

Referring to FIG. 1 and FIG. 2, FIG. 1 is a schematic diagram illustrating a display device according to a first embodiment of the present disclosure, and FIG. 2 is a circuit diagram of the display device in FIG. 1. In order to make the drawings more simple and easy to understand, FIG. 1 only shows the structure of a pixel unit of the display device 100, and omits thin film transistors, capacitors, scan lines, data lines, emission signal lines (power lines), reset signal lines, read signal lines, or other related driving signal lines in the pixel circuitry and fingerprint sensor circuitry. In addition, FIG. 4 to FIG. 8 in the present disclosure also only show the structure of one of the pixel units in the display device 100 as an example. The display device 100 of this embodiment may include a substrate 102 (shown in FIG. 3), a plurality of pixel circuitries, a plurality of fingerprint sensor circuitries, a plurality of light emitting units, and a plurality of fingerprint sensor units. The pixel circuitries, the fingerprint sensor circuitries, the light emitting units, and the fingerprint sensor units may be disposed on the substrate 102. The light emitting units may be disposed above the pixel circuitries (e.g., upward emitting type) or the light emitting units may be disposed below the pixel circuitries (e.g., downward emitting type), and the light emitting units may be electrically connected to the pixel circuitries and driven by the pixel circuitries. The fingerprint sensor units may be disposed above the fingerprint sensor circuitries or the fingerprint sensor units may be disposed below the fingerprint sensor circuitries, and the fingerprint sensor units may be electrically connected to the fingerprint sensor circuitries and driven by the fingerprint sensor circuitries. In this embodiment, the material of the substrate 102 may include glass, quartz, sapphire, polymers (such as polyimide (PI), polyethylene terephthalate (PET)), and/or other suitable materials to be used as a flexible substrate or a rigid substrate, but not limited thereto.

The technical features of this embodiment are described with one of the pixel units in the display device 100 hereinafter. As shown in FIG. 1, the display device 100 may include a first light emitting unit 1041, a second light emitting unit 1043, and a third light emitting unit 1045. The first light emitting unit 1041, the second light emitting unit 1043, and the third light emitting unit 1045 may be disposed side by side along a first direction D1, and the third light emitting unit 1045 may be disposed between the first light emitting unit 1041 and the second light emitting unit 1043, but not limited thereto. In this embodiment, the first light emitting unit 1041, the second light emitting unit 1043, and the third light emitting unit 1045 may emit different color lights. The first light emitting unit 1041 may emit blue light, the second light emitting unit 1043 may emit red light, and the third light emitting unit 1045 may emit green light, but not limited thereto. In this embodiment, the light emitting units may include organic light emitting diodes (OLED), but not limited thereto. In some embodiments, the light emitting units may include OLED, LED, mini LED, micro-LED, quantum dot LED (QLED, QDLED), or any combination thereof, but not limited thereto. In some embodiments, the light emitting units may be different portions of the liquid crystal display used for emitting different color lights, but not limited thereto. In some embodiments, the light emitting units may also emit other kinds of light in non-visible wavelength band, such as ultraviolet light or infrared light.

In the first light emitting unit 1041, the second light emitting unit 1043, and third light emitting unit 1045 in FIG. 1, the range or boundary of each of the light emitting units may be defined by the range or boundary of one of the electrodes of the OLED, but not limited thereto. For example, the light emitting unit may be a diode. Generally, the diode may mainly include an anode (bottom electrode), a light emitting layer, and a cathode (top electrode). The anode may usually be electrically connected to a thin film transistor, the cathode may be electrically connected to a common voltage source, and light can be emitted when current flows through the light emitting layer. The range or boundary of each of the light emitting unit may be defined by the range or boundary of the bottom electrode or anode of OLED, but not limited thereto. In addition, the actual light emitting area of each of the light emitting units may be greater than, equal to, or less than the area of the bottom electrode. The shape of the light emitting unit is not limited to that shown in FIG. 1, and the light emitting unit may have different shapes according to requirements.

As shown in FIG. 1, the area of the first light emitting unit 1041 may be greater than the area of the second light emitting unit 1043, and the area of the second light emitting unit 1043 may be greater than the area of the third light emitting unit 1045, but not limited thereto. The areas of the light emitting units can be designed according to the lifetimes, luminous efficiencies, or hue requirements of light emitting materials used for emitting different color lights. For example, when the lifetime of the light emitting material used for emitting light with a certain color is short, the area of the light emitting unit used for emitting this light may be increased, whereas when the lifetime of the light emitting material used for emitting light of a certain color is long, the area of the light emitting unit used for emitting this light may be reduced, but not limited thereto.

As shown in FIG. 1 and FIG. 2, the display device 100 may include a first pixel circuitry 1061, a second pixel circuitry 1063, and a third pixel circuitry 1065. The first pixel circuitry 1061, the second pixel circuitry 1063, and the third pixel circuitry 1065 may be disposed side by side along the first direction D1, and the third pixel circuitry 1065 may be disposed between the first pixel circuitry 1061 and the second pixel circuitry 1063, but not limited thereto. The first light emitting unit 1041 may be disposed above (or below) the first pixel circuitry 1061, and the first light emitting unit 1041 may be electrically connected to the first pixel circuitry 1061 and driven by the first pixel circuitry 1061. The first light emitting unit 1041 may overlap with the first pixel circuitry 1061 in a top view direction V, and a portion of the first light emitting unit 1041 may extend out of the first pixel circuitry 1061, but not limited thereto. The top view direction V may be, for example, a normal direction perpendicular to the surface of the substrate 102. The second light emitting unit 1043 may be disposed above (or below) the second pixel circuitry 1063, the second light emitting unit 1043 may be electrically connected to the second pixel circuitry 1063 and driven by the second pixel circuitry 1063, and the second light emitting unit 1043 may overlap with the second pixel circuitry 1063 in the top view direction V. The third light emitting unit 1045 may be disposed above (or below) the third pixel circuitry 1065, the third light emitting unit 1045 may be electrically connected to the third pixel circuitry 1065 and driven by the third pixel circuitry 1065, and the third light emitting unit 1045 may overlap with the third pixel circuitry 1065 in the top view direction V. In this embodiment, the area of the first pixel circuitry 1061, the area of the second pixel circuitry 1063, and the area of the third pixel circuitry 1065 may be approximately equal, but not limited thereto. In addition, the shape of the pixel circuitry is not limited to that shown in FIG. 1, and the pixel circuitry may have different shapes according to requirements.

In addition, the display device 100 may include a plurality of scan lines, a plurality of data lines, and a plurality of emission signal lines disposed on the substrate 102. As shown in FIG. 1 and FIG. 2, the scan lines (such as the scan line 1121 and the scan line 1123) may extend along the first direction D1, the data lines 114 and the emission signal lines 116 (shown in FIG. 2) may extend along a second direction D2, and the data lines 114 and the emission signal lines 116 may cross the scan line 1121 and the scan line 1123, but not limited thereto. In other embodiments, the data lines 114, the emission signal lines 116, and the scan lines 1121, 1123 may not necessarily be straight lines, but they may still substantially extend in a direction. In other embodiments, the scan lines 1121, 1123 may extend in different directions, the data lines 114 or the emission signal lines 116 may also extend in other directions different from the second direction D2, and the data lines 114 or the emission signal lines 116 may be partially or completely parallel to the scan lines 1121, 1123.

The first pixel circuitry 1061, the second pixel circuitry 1063, and the third pixel circuitry 1065 in FIG. 1 and FIG. 2 may all be electrically connected to the scan line 1121 and respectively electrically connected to one of the data lines 114 and one of the emission signal lines 116. In addition, the scan line 1123 may be electrically connected to the first pixel circuitry 1061, the second pixel circuitry 1063, and the third pixel circuitry 1065 in another row. Taking FIG. 2 as an example, each of the pixel circuitries may include two thin film transistors electrically connected to each other, the gate of the thin film transistor T11 may be electrically connected to the scan line 1121, the first terminal of the thin film transistor T11 may be electrically connected to one of the data lines 114, and the second terminal of the thin film transistor T11 may be electrically connected to the gate of another thin film transistor T12, but not limited thereto. The first terminal of the thin film transistor T12 may be electrically connected to the emission signal line 116, the second terminal of the thin film transistor T12 may be electrically connected to the corresponding light emitting unit, and the emission signal line 116 may provide a voltage to the thin film transistor T12, but not limited thereto. In addition, the first terminal and the second terminal of the thin film transistor described herein may be, for example, source and drain, or drain and source.

Referring to FIG. 2, the pixel circuitry in this disclosure may include, for example, the thin film transistors electrically connected to the corresponding light emitting unit and/or the thin film transistors used for driving the corresponding light emitting unit, and the area and boundary of the pixel circuitry may be the area and boundary occupied by these elements. The pixel circuitry may not include the data lines 114, scan lines 1121, 1123, emission signal lines 116, or other signal lines used for transmitting signals. Specifically, the pixel circuitry may include a portion of signal lines used for forming the structure of the thin film transistor. For example, a portion of the scan line forming the gate of the thin film transistor, a portion of the data line, or a portion of the emission signal line. In addition, the number or connection relationship of the thin film transistors in the pixel circuitry of the present disclosure is not limited to the above description. Each of the pixel circuitries may include, for example, more than two thin film transistors, such as three, four, six, seven, or other numbers of thin film transistors. The definition of fingerprint sensor circuitry is basically similar to that of the pixel circuitry. The difference is that the first fingerprint sensor circuitry is electrically connected to the fingerprint sensor unit and drives the fingerprint sensor unit, and the connection of thin film transistors in the fingerprint sensor circuitry and the number of thin film transistors in the fingerprint sensor circuitry may be different from those of thin film transistors in the pixel circuitry. Moreover, in some embodiments, the pixel circuitry 1061/1063/1065 and the fingerprint sensor circuitry 110 are electrically connected to the same scan line 1121, but not limited thereto.

Referring to FIG. 1, the display device 100 may include a fingerprint sensor unit 108 and a fingerprint sensor circuitry 110. The fingerprint sensor unit 108 may be disposed above the fingerprint sensor circuitry 110 (e.g., top side sensing) or the fingerprint sensor unit 108 may be disposed below the fingerprint sensor circuitry 110 (e.g., bottom side sensing), the fingerprint sensor unit 108 may be electrically connected to the fingerprint sensor circuitry 110 and driven by the fingerprint sensor circuitry 110, and the fingerprint sensor unit 108 may overlap with the fingerprint sensor circuitry 110 in the top view direction V. The fingerprint sensor unit 108 of this embodiment may include a photodiode (such as a PIN diode or other suitable photoelectric conversion elements) used for detecting the intensity of light reflected by the finger to perform fingerprint identification, but not limited thereto. In other embodiments, the fingerprint sensor unit 108 may include a capacitor or a piezoelectric element. In some embodiments, the fingerprint sensor unit 108 may be capacitors or pressure sensing elements, the fingerprint sensor unit 108 may not be used for fingerprint sensing, the fingerprint sensor unit 108 may be used for touch sensing, pressure sensing, etc. for example. In addition, the shapes of the fingerprint sensor unit 108 and the fingerprint sensor circuitry 110 are not limited to those shown in FIG. 1, and may have different shapes according to requirements.

As shown in FIG. 1, in the second direction D2, the fingerprint sensor circuitry 110 may be disposed on one side of the first pixel circuitry 1061, the second pixel circuitry 1063, and the third pixel circuitry 1065, and the fingerprint sensor unit 108 may be disposed on one side of the second light emitting unit 1043 and the third light emitting unit 1045, but not limited thereto. For example, the second direction D2 may be perpendicular to the first direction D1, but not limited thereto. In this embodiment, the first light emitting unit 1041 may extend to the top of the fingerprint sensor circuitry 110 along the second direction D2, and the first light emitting unit 1041 may overlap with at least a portion of the fingerprint sensor circuitry 110 in the top view direction V, but not limited thereto. In addition, the second light emitting unit 1043 and the third light emitting unit 1045 do not extend to the top of the fingerprint sensor circuitry 110, but not limited thereto. In some embodiments, the third light emitting unit 1045 may extend to the top of the fingerprint sensor circuitry 110 in the second direction D2, and the third light emitting unit 1045 may overlap at least a portion of the fingerprint sensor circuitry 110 in the top view direction V. Further, the first light emitting unit 1041 and the second light emitting unit 1043 do not extend to the top of the fingerprint sensor circuitry 110, and the fingerprint sensor unit 108 may be disposed on one side of the first light emitting unit 1041 and the second light emitting unit 1043, but not limited thereto.

In addition, the ratios of areas between the fingerprint sensor unit and the light emitting units can be adjusted according to requirements of the display effect or fingerprint sensitivity. For example, in this embodiment, the ratio of the area of the fingerprint sensor unit 108 to the area of the first light emitting unit 1041 may be 0.1 to 2 (greater than or equal to 0.1 and less than or equal to 2), or may be 0.1 to 1 (greater than or equal to 0.1 and less than or equal to 1). The range or boundary of the fingerprint sensor unit 108 may be defined by the range or boundary of one of the electrodes (such as the bottom electrode) of the photodiode, but not limited thereto. The display device 100 may have high density of fingerprint sensor units 108 and may provide high sensitivity of fingerprint sensing while maintaining high resolution of the display image when the ratio is in the above range. In addition, the ratio of the area of the fingerprint sensor unit 108 to the area of the second light emitting unit 1043, or the ratio of the area of the fingerprint sensor unit 108 to the area of the third light emitting unit 1045 may also be in the above range, but not limited thereto.

In the pixel unit in FIG. 1, the fingerprint sensor circuitry 110 may be electrically connected to two adjacent scan lines 1121, 1123 through a conductive line 1111 and a conductive line 1113. Taking FIG. 2 as an example, the fingerprint sensor circuitry 110 may include at least two thin film transistors electrically connected to each other. The gate of the thin film transistor T21 may be electrically connected to the scan line 1121, the first terminal of the thin film transistor T21 may be electrically connected to a reset signal line 118, and the second terminal of the thin film transistor T21 may be electrically connected to the fingerprint sensor unit 108, but not limited thereto. The gate of the thin film transistor T22 may be electrically connected to the scan line 1123, the first terminal of the thin film transistor T21 may be electrically connected to the fingerprint sensor unit 108, and the second terminal of the thin film transistor T21 may be electrically connected to the read signal line 120, but not limited thereto. Thus, the integrated circuit chip in the display device 100 may detect the change of current generated by the fingerprint sensor unit 108 through the read signal line 120, and the fingerprint sensor unit 108 may return to the initial state through the reset signal line 118 before each operation.

In some variant embodiments of the first embodiment, the thin film transistor T21 of the fingerprint sensor circuitry 110 may not be electrically connected to the scan line 1121. For example, the display device 100 may include a plurality of control signal lines extending parallel to the scan lines 1121, 1123, and one of the control signal lines may be disposed between the scan line 1121 and the scan line 1123. The thin film transistor T21 may be electrically connected to the control signal line, and the thin film transistor T22 may still be electrically connected to the scan line 1123, but not limited thereto.

Similar to the definition of the pixel circuitry, the fingerprint sensor circuitry 110 may include, for example, at least one thin film transistor electrically connected to the corresponding fingerprint sensor unit 108 and/or used for driving the corresponding fingerprint sensor unit 108, and the area and boundary of the fingerprint sensor circuitry 110 may be the area and boundary occupied by these elements. The fingerprint sensor circuitry 110 may not include the data line 114, scan lines 1121, 1123, emission signal line 116, reset signal line 118, read signal line 120, or other signal lines used for transmitting signals. Specifically, the fingerprint sensor circuitry 110 may include a portion of signal lines used for forming the structure of thin film transistors, such as a portion of the scan line used for forming the gate of the thin film transistor. In addition, the number of the thin film transistors in the fingerprint sensor circuitry 110 of the present disclosure or the connection relationship of the thin film transistors in the fingerprint sensor circuitry 110 of the present disclosure is not limited to the above description. Each of the fingerprint sensor circuitries 110 may include, for example, more than two thin film transistors, such as three, four, six, seven, or other numbers of thin film transistors.

The operation of the fingerprint sensing of the display device 100 of this embodiment can be described by the following examples, but not limited thereto. For example, the display device 100 may include the display function, touch sensing function, and fingerprint sensing function. The display device 100 can determine the touch position when the user's finger touches the display device 100 and when the display device 100 displays images or does not display images. The display device 100 can drive pixels disposed near the touch position to emit green light (which can also be other color light with high sensitivity to sensors), and drive the fingerprint sensor disposed near the touch position to detect fingerprints.

As described above, in the display device 100 of this embodiment, each of the pixel units includes the fingerprint sensor unit 108 and the fingerprint sensor circuitry 110 used for driving the fingerprint sensor unit 108 in addition to the red sub-pixel, blue sub-pixel, green sub-pixel, and the pixel circuitry used for driving the above sub-pixels. The fingerprint sensor can be integrated into the display region of the display device 100, and the display region can be further expanded to make the edge of the display region closer to the edge of the display device 100, thereby achieving the advantage of enlarging the screen proportion or narrowing the frame. In addition, the fingerprint sensor circuitry 110 and the pixel circuitries of this embodiment can electrically connected to the scan lines 1121, 1123 without additionally disposing signal lines for transmitting signals to the fingerprint sensor circuitry 110, which can reduce the number of conductive lines in the display device 100 and save space. The cross-sectional structure of the display device 100 of this embodiment will be described below.

Figure 3:
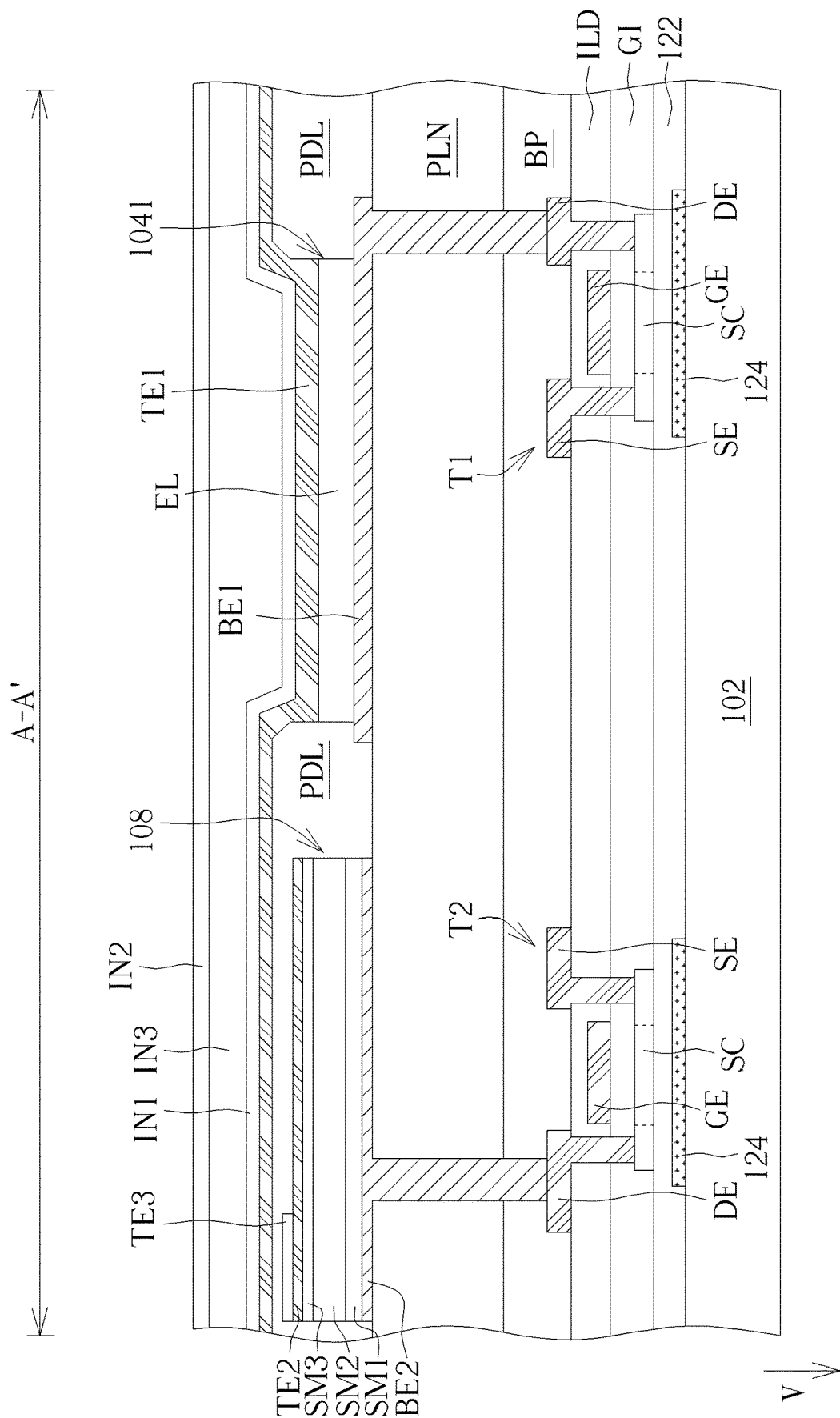
FIG. 3 is a cross-sectional schematic diagram illustrating a structure taken along the line A-A' of FIG. 1.

Referring to FIG. 3, it is a cross-sectional schematic diagram illustrating a structure taken along the line A-A' of FIG. 1. In order to make the drawing more simplified and easy to understand, FIG. 3 only shows one of the thin film transistors in the first pixel circuitry 1061 and one of the thin film transistors in the fingerprint sensor circuitry 110 as an example. The numbers of thin film transistors in the first pixel circuitry 1061 and the fingerprint sensor circuitry 110 are not limited to that shown in FIG. 3. In the top view direction V, the thin film transistor T1 of the first pixel circuitry 1061 may be disposed between the first light emitting unit 1041 and the substrate 102, and the thin film transistor T2 of the fingerprint sensor circuitry 110 may be disposed between the fingerprint sensor unit 108 and the substrate 102, but not limited thereto. The thin film transistor T1 and the thin film transistor T2 may be disposed on a buffer layer 122, and the thin film transistor T1 and the thin film transistor T2 (or the first pixel circuitry 1061 and the fingerprint sensor circuitry 110) of this embodiment may be disposed on the same plane, but not limited thereto. In an embodiment, the thin film transistor T1 and the thin film transistor T2 both directly disposed on a top surface of the buffer layer 122. In another embodiment, the buffer layer 122 may be disposed between the thin film transistors T1, T2 and the substrate 102. In addition, the display device 100 may further include a light shielding layer 124 disposed between the thin film transistor T1 and the substrate 102, and the light shielding layer 124 may be disposed under the buffer layer 122.

The thin film transistors T1, T2 respectively may include a gate GE, a source SE, a drain DE, and a semiconductor layer SC. The semiconductor layer SC may be disposed on the buffer layer 122, and two doped regions of the semiconductor layer SC respectively may be located at two ends of the semiconductor layer SC, and the doped regions respectively may be used for electrically connecting the source SE and the drain DE. The gate GE may be disposed on the semiconductor layer SC, and a gate insulating layer GI may be disposed between the gate GE and the semiconductor layer SC. An interlayer dielectric layer ILD may cover the gate GE, and the source SE and the drain DE may be disposed on the interlayer dielectric layer ILD. In addition, an insulating layer BP may cover the source SE and the drain DE, and a planarization layer PLN may be disposed on the insulating layer BP. The laminated structures of the above-mentioned thin film transistors T1, T2 may be top gate thin film transistors for example, the thin film transistors T1, T2 may also be bottom gate thin film transistors according to the requirements, or the material of the semiconductor layer may also be adjusted according to the requirements.

The first light emitting unit 1041 may be disposed on the planarization layer PLN. The first light emitting unit 1041 of this embodiment may be an OLED for example. The first light emitting unit 1041 may include a lower electrode BE1, a light emitting material layer EL, and an upper electrode TE1, but not limited thereto. The bottom electrode BE1 may be disposed on the planarization layer PLN and electrically connected to the drain DE of the thin film transistor T1. The bottom electrode BE1 may be, for example, an anode of the first light emitting unit 1041, but not limited thereto. The light emitting material layer EL may be disposed on the bottom electrode BE1 and in an opening of a pixel defining layer PDL. The light emitting material layer EL may include the organic light emitting material, but not limited thereto. The top electrode TE1 may be disposed on the light emitting material layer EL and the pixel definition layer PDL, and the top electrode TE1 may be, for example, a common cathode electrically connected to a common voltage signal source, but not limited thereto.

The fingerprint sensor unit 108 may be disposed on the planarization layer PLN and covered by the pixel definition layer PDL. Therefore, the first light emitting unit 1041 and the fingerprint sensor unit 108 may be disposed on the same plane, but not limited thereto. The fingerprint sensor unit 108 may also be disposed on the insulating layer BP. The fingerprint sensor unit 108 of this embodiment may include a PIN diode (or may be an inorganic or organic diode), but not limited thereto. The PIN diode may include a first semiconductor layer SM1, a second semiconductor layer SM2, and a third semiconductor layer SM3. The third semiconductor layer SM3 may be disposed on the first semiconductor layer SM1, and the second semiconductor layer SM2 may be disposed between the first semiconductor layer SM1 and the third semiconductor layer SM3. The first semiconductor layer SM1 may be N-type semiconductor layer, the second semiconductor layer SM2 may be an intrinsic layer, and the third semiconductor layer SM3 may be P-type semiconductor layer, but not limited thereto. In some embodiments, the first semiconductor layer SM1 may be P-type semiconductor layer, and the third semiconductor layer SM3 may be N-type semiconductor layer. In addition, the fingerprint sensor unit 108 may further include a top electrode TE2 and a bottom electrode BE2 disposed on the upper and lower sides of the PIN diode. The bottom electrode BE2 may be disposed between the planarization layer PLN and the first semiconductor layer SM1, and the bottom electrode BE2 may be electrically connected to the drain DE of the thin film transistor T2. The top electrode TE2 may be disposed between the third semiconductor layer SM3 and the pixel defining layer PDL, and the top electrode TE2 may be electrically connected to a signal line TE3. In addition, an inorganic insulating layer IN1 may be disposed on the top electrode TE1, an inorganic insulating layer IN2 may be disposed on the inorganic insulating layer IN1, and an organic insulating layer IN3 may be disposed between the inorganic insulating layer IN1 and the inorganic insulating layer IN2, but not limited thereto.

For example, the materials of the gate GE, the source SE, the drain DE, and/or the bottom electrodes BE1, BE2 may include metals (e.g., silver (Ag), copper (Cu), or aluminum (Al)), metal oxides, other suitable conductive materials, or combinations thereof, but not limited thereto. The materials of the top electrodes TE1, TE2 may include transparent conductive materials (e.g., indium tin oxide (ITO), indium zinc oxide (IZO), etc.), metals (e.g., silver (Ag)), other suitable conductive materials, or combinations thereof, but not limited thereto. The materials of the buffer layer 122, the gate insulating layer GI, the interlayer dielectric layer ILD, the insulating layer BP, the planarization layer PLN, and/or the pixel defining layer PDL may include silicon oxide, silicon nitride, silicon oxynitride, other suitable insulating materials, or combinations thereof, but not limited thereto. The material of the semiconductor layer SC may include polycrystalline silicon, amorphous silicon, metal oxide semiconductor (IGZO), other suitable semiconductor materials, or combinations thereof, but not limited thereto. The material of the light shielding layer 124 may include metal or metal oxide, but not limited thereto.

The display device of the present disclosure is not limited by the aforementioned embodiment, and may have other different embodiments and variant embodiments. To simplify the description, similar components in each of the following embodiments are marked with similar symbols. For making it easier to compare the difference between the embodiments, the following description will detail the dissimilarities among different embodiments and the similar features will not be redundantly described.

Figure 4:
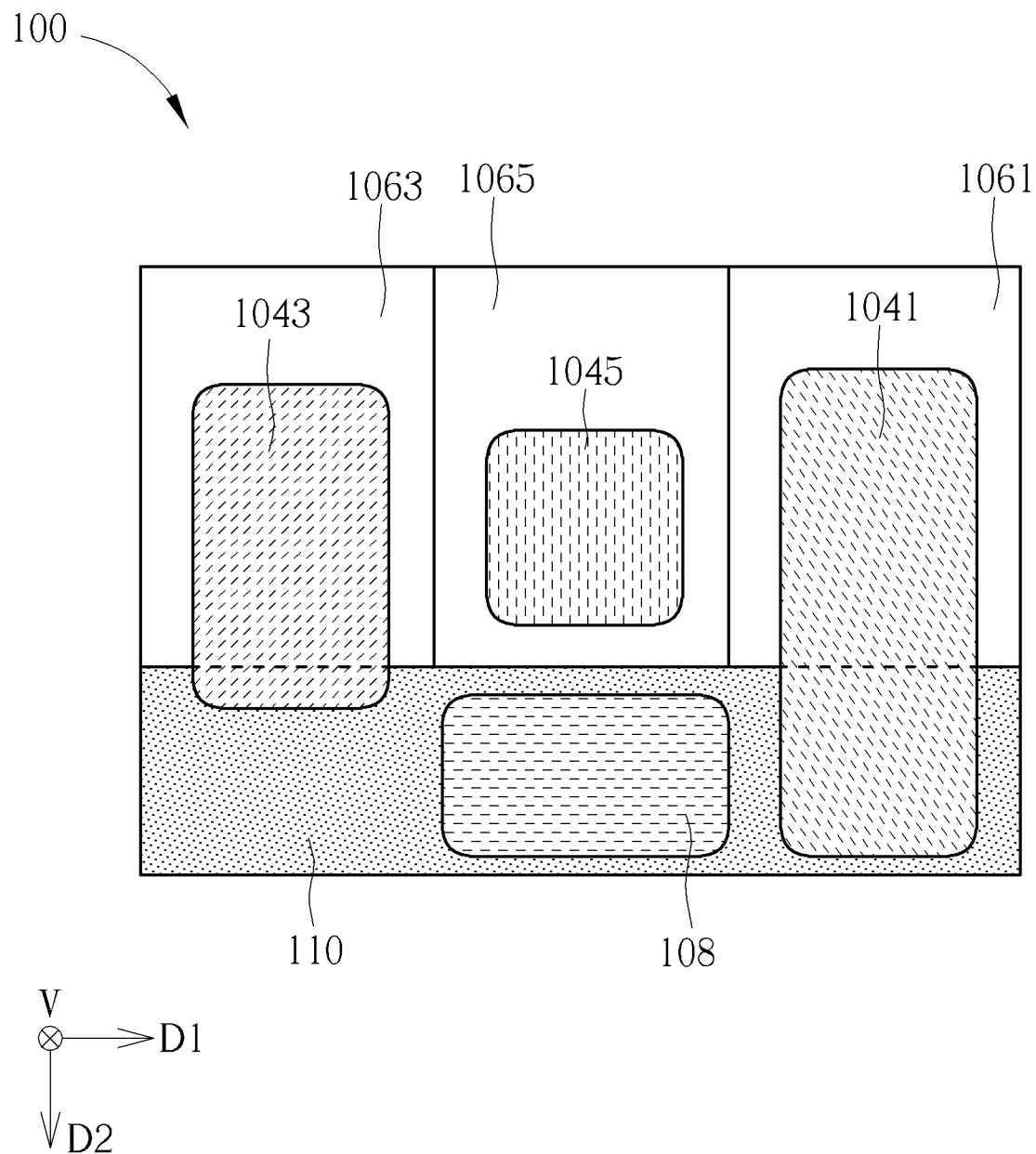
FIG. 4 is a schematic diagram illustrating a display device according to a second embodiment of the present disclosure.

Referring to FIG. 4, it is a schematic diagram illustrating a display device according to a second embodiment of the present disclosure. Different from the first embodiment, the second light emitting unit 1043 of this embodiment may also extend to the top of the fingerprint sensor circuitry 110 along the second direction D2, and the second light emitting unit 1043 may overlap with at least another portion of the fingerprint sensor circuitry 110 in the top view direction V, but not limited thereto. In this embodiment, the first light emitting unit 1041 and the second light emitting unit 1043 can be extended to the top of the fingerprint sensor circuitry 110 by reducing the area of the fingerprint sensor unit 108, but not limited thereto. Additionally, the third light emitting unit 1045 of this embodiment may not extend to the top of the fingerprint sensor circuitry 110, but not limited thereto. In this embodiment, the first light emitting unit 1041 may emit blue light, the second light emitting unit 1043 may emit red light, and the third light emitting unit 1045 may emit green light, but not limited thereto. In addition, the overlapping area of the second light emitting unit 1043 and the fingerprint sensor circuitry 110 may be less than the overlapping area of the first light emitting unit 1045 and the fingerprint sensor circuitry 110, but not limited thereto. However, in some embodiments, the first light emitting unit 1041 may emit blue light, the second light emitting unit 1043 may emit green light, and the third light emitting unit 1045 may emit red light, or in some embodiments, the first light emitting unit 1041 may emit green light, but not limited thereto.

Figure 5:
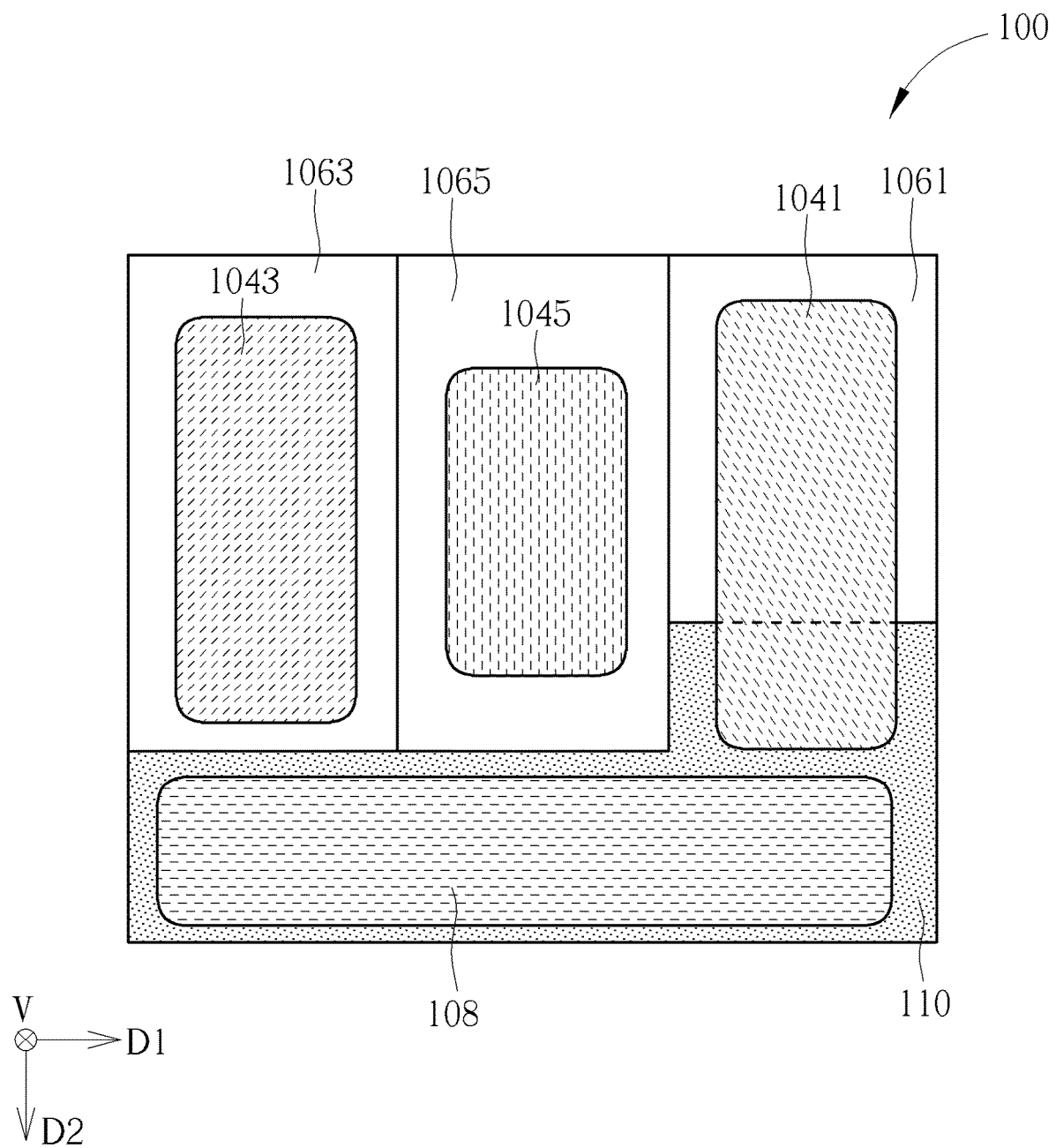
FIG. 5 is a schematic diagram illustrating a display device according to a third embodiment of the present disclosure.

Referring to FIG. 5, it is a schematic diagram illustrating a display device according to a third embodiment of the present disclosure. Different from the first embodiment, the area of the first pixel circuitry 1061 may be reduced, the area of the fingerprint sensor circuitry 110 may be increased, and the area of the first pixel circuitry 1061 may be less than the area of the second pixel circuitry 1063 and/or the area of the third pixel circuitry 1065 in this embodiment. The area of the pixel circuitry or the area the fingerprint sensor circuitry 110 may be adjusted by adjusting the number of thin film transistors included therein or the sizes (e.g., areas) of the thin film transistors. For example, the first pixel circuitry 1061 may include three to four thin film transistors, and the second pixel circuitry 1063 and the third pixel circuitry 1065 may include six to seven thin film transistors, but not limited thereto. For example, the second pixel circuitry 1063 and the third pixel circuitry 1065 may include compensation circuits, and the first pixel circuitry 1061 may not include the compensation circuit and require an external compensation circuit, but not limited thereto. Alternatively, the first pixel circuitry 1061, the second pixel circuitry 1063, and the third pixel circuitry 1065 may include the same number of thin film transistors, but the sizes of the thin film transistors in the first pixel circuitry 1061 may be less than the sizes of the thin film transistors in the second pixel circuitry 1063 and the third pixel circuitry 1065. In addition, the above method of adjusting the size of the circuitry can also be applied to the fingerprint sensor circuitry 110 or other embodiments.

In some variant embodiments of the third embodiment, the difference between these variant embodiments and the third embodiment is that the area of the second light emitting unit 1043 and/or the area of the third light emitting unit 1045 may be reduced and the area of the fingerprint sensor unit 108 may be increased, a portion of the fingerprint sensor unit 108 may extend to the top of the second pixel circuitry 1063 and the third pixel circuitry 1065 along the second direction D2, and the portion of the fingerprint sensor unit 108 may partially overlap with the second pixel circuitry 1063 and the third pixel circuitry 1065, but not limited thereto.

Figure 6:
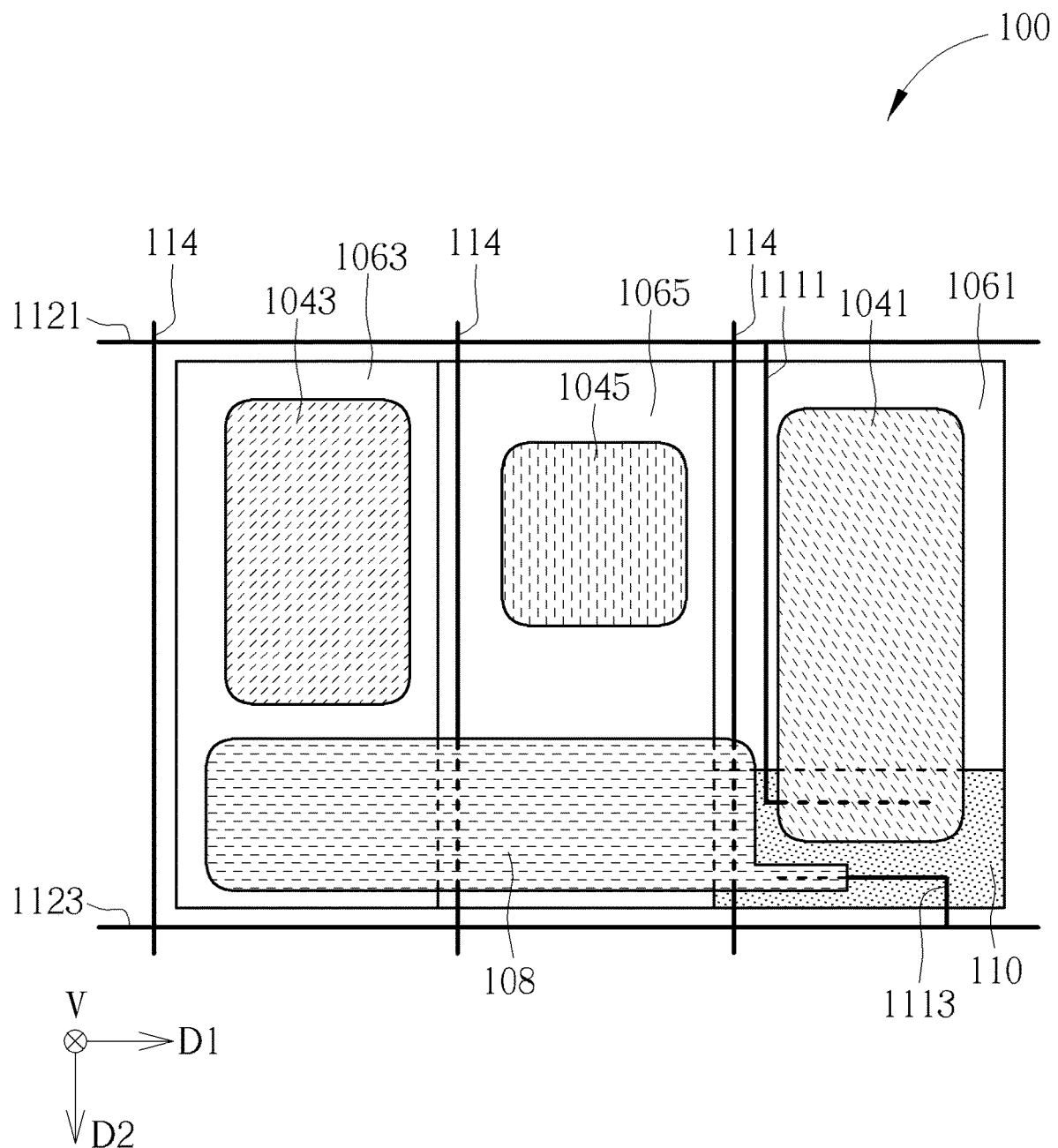
FIG. 6 is a schematic diagram illustrating a display device according to a fourth embodiment of the present disclosure.

Referring to FIG. 6, it is a schematic diagram illustrating a display device according to a fourth embodiment of the present disclosure. Different from the first embodiment, the area of the first pixel circuitry 1061 may be less than the area of the second pixel circuitry 1063 and the area of the third pixel circuitry 1065, and the area of the fingerprint sensor circuitry 110 may be less than the area of the first pixel circuitry 1061 in this embodiment, but not limited thereto. For example, the first pixel circuitry 1061 and the fingerprint sensor circuitry 110 may be disposed on one side of the third pixel circuitry 1065 in the first direction D1, and the fingerprint sensor circuitry 110 may be disposed on one side of the first pixel circuitry 1061 in the second direction D2, but not limited thereto. In addition, the fingerprint sensor unit 108 may partially overlap with at least one of the first pixel circuitry 1061, the second pixel circuitry 1063, and the third pixel circuitry 1065. Taking FIG. 6 as an example, the fingerprint sensor unit 108 may partially overlap with the first pixel circuitry 1061, the second pixel circuitry 1063, and the third pixel circuitry 1065, but not limited thereto.

In some embodiments, the difference between these embodiments and the fourth embodiment is that the area of the second pixel circuitry 1063 and the area of the third pixel circuitry 1065 may be less than the area of the first pixel circuitry 1061, but not limited thereto. For example, the second pixel circuitry 1063, the third pixel circuitry 1065, and the fingerprint sensor circuitry 110 may be disposed on one side of the first pixel circuitry 1061 in the first direction D1, and the fingerprint sensor circuitry 110 may be disposed on one side of the second pixel circuitry 1063 and the third pixel circuitry 1065 in the second direction D2, but not limited thereto.

Figure 7:
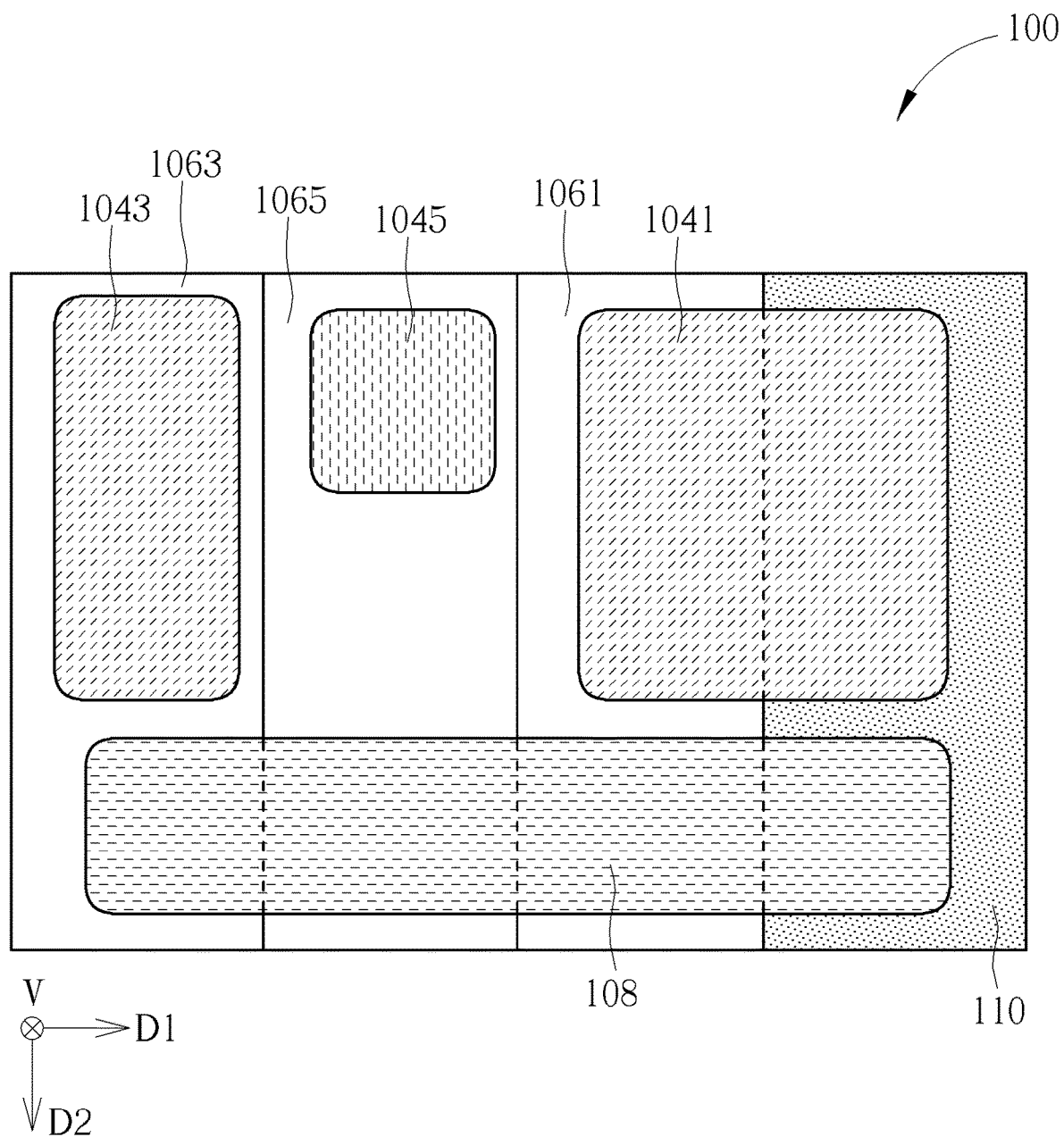
FIG. 7 is a schematic diagram illustrating a display device according to a fifth embodiment of the present disclosure.

Referring to FIG. 7, it is a schematic diagram illustrating a display device according to a fifth embodiment of the present disclosure. Different from the first embodiment, the first pixel circuitry 1061, the second pixel circuitry 1063, the third pixel circuitry 1065, and the fingerprint sensor circuitry 110 of this embodiment may be disposed side by side along the first direction D1, and the first pixel circuitry 1061 may be disposed between the third pixel circuitry 1065 and the fingerprint sensor circuitry 110, but not limited thereto. In addition, the fingerprint sensor unit 108 may extend from the fingerprint sensor circuitry 110 to the second pixel circuitry 1063 and cross the first pixel circuitry 1061 and the third pixel circuitry 1065, but not limited thereto.

Figure 8:
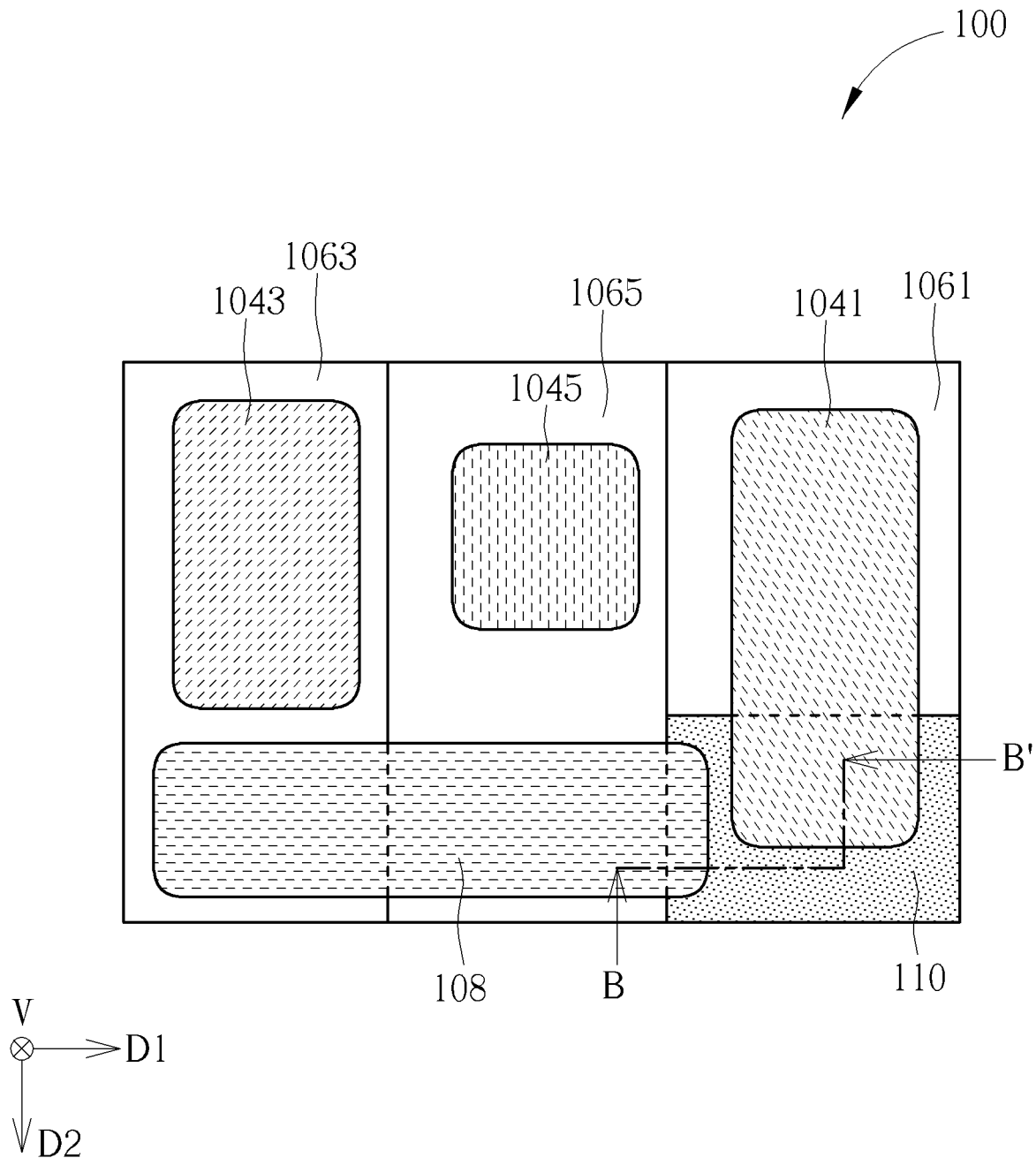
FIG. 8 is a schematic diagram illustrating a display device according to a sixth embodiment of the present disclosure.
Figure 9:
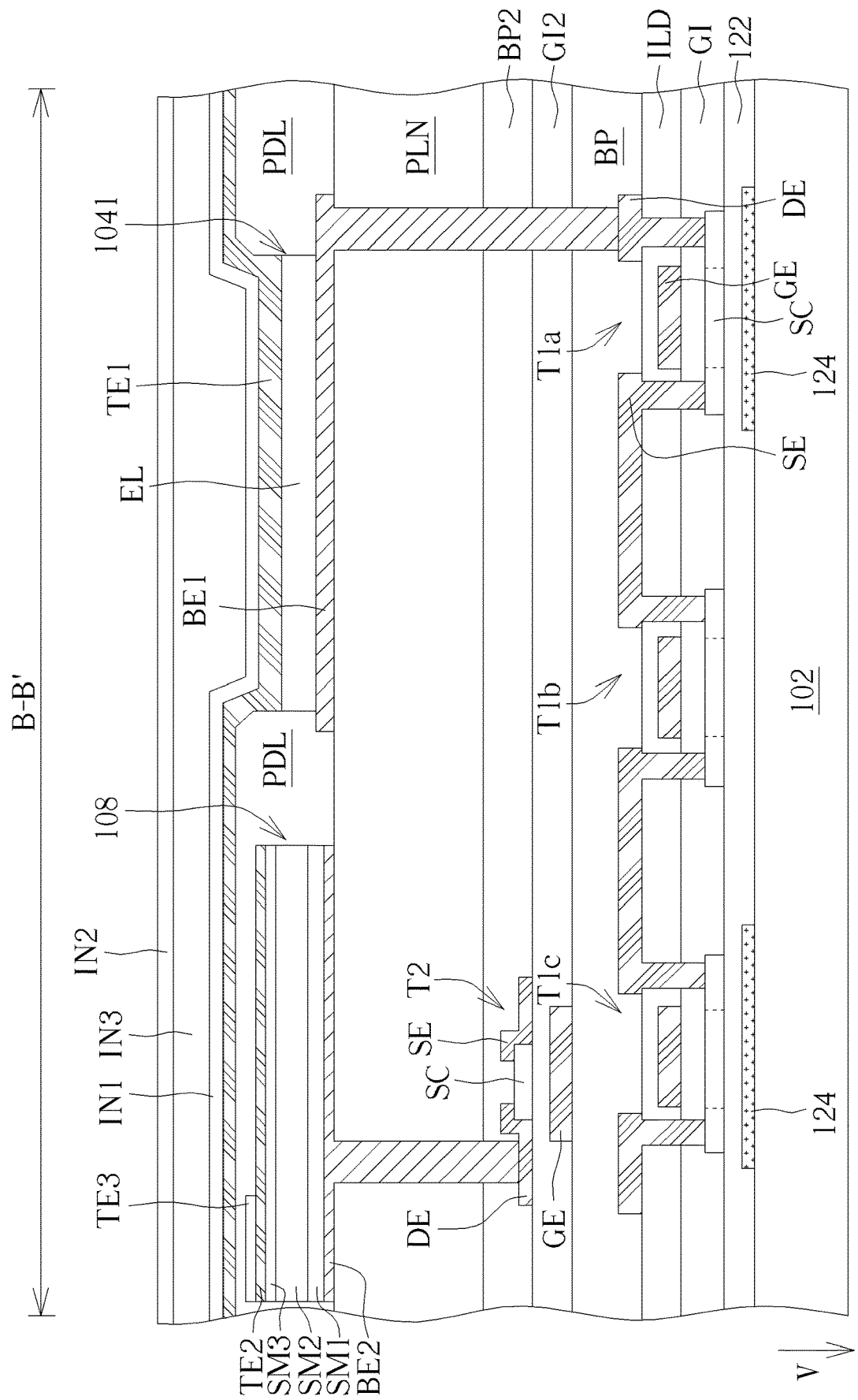
FIG. 9 is a cross-sectional schematic diagram illustrating a structure taken along the line B-B' of FIG. 8.

Referring to FIG. 8 and FIG. 9, FIG. 8 is a schematic diagram illustrating a display device according to a sixth embodiment of the present disclosure, and FIG. 9 is a cross-sectional schematic diagram illustrating a structure taken along the line B-B' of FIG. 8. In order to make the drawings more simple and easy to understand, FIG. 9 only illustrates three thin film transistors T1$a$, T1$b$, and T1$c$ in the first pixel circuitry 1061 and one of the thin film transistors (the thin film transistor T2) in the fingerprint sensor circuitry 110 as an example. The numbers of thin film transistors in the first pixel circuitry 1061 and the fingerprint sensor circuitry 110 are not limited to that shown in FIG. 9. As shown in FIG. 8, the difference between this embodiment and the first embodiment is that the fingerprint sensor circuitry 110 of this embodiment may overlap with a portion of the first pixel circuitry 1061 in the top view direction V. Taking FIG. 9 as an example, the thin film transistor T2 of the fingerprint sensor circuitry 110 may be disposed between the fingerprint sensor unit 108 and the thin film transistor T1$c$ of the first pixel circuitry 1061 in the top view direction V. The thin film transistor T2 (or the fingerprint sensor circuitry 110) and the thin film transistors T1$a$, T1$b$, and T1$c$ (or the first pixel circuitry 1061) may be disposed on different planes in this embodiment. For example, the thin film transistors T1$a$, T1$b$, and T1$c$ may be disposed on the buffer layer 122, and the thin film transistor T2 may be disposed on the insulating layer BP, but not limited thereto. Since the thin film transistor T2 and the thin film transistors T1$a$, T1$b$, and T1$c$ may be disposed on different planes, the display device 100 of this embodiment may further include a gate insulating layer GI2 and an insulating layer BP2, the gate insulating layer GI2 may be disposed between the gate GE and the semiconductor layer SC of the thin film transistor T2, and the insulating layer BP2 may be disposed between the gate insulating layer GI2 and the planarization layer PLN and cover the source SE and the drain DE of the thin film transistor T2, but not limited thereto. In this embodiment, the thin film transistors T1$a$, T1$b$, and T1$c$ may be top-gate type thin film transistors and the thin film transistor T2 may be a bottom-gate type thin film transistor, but not limited thereto.

Figure 10:
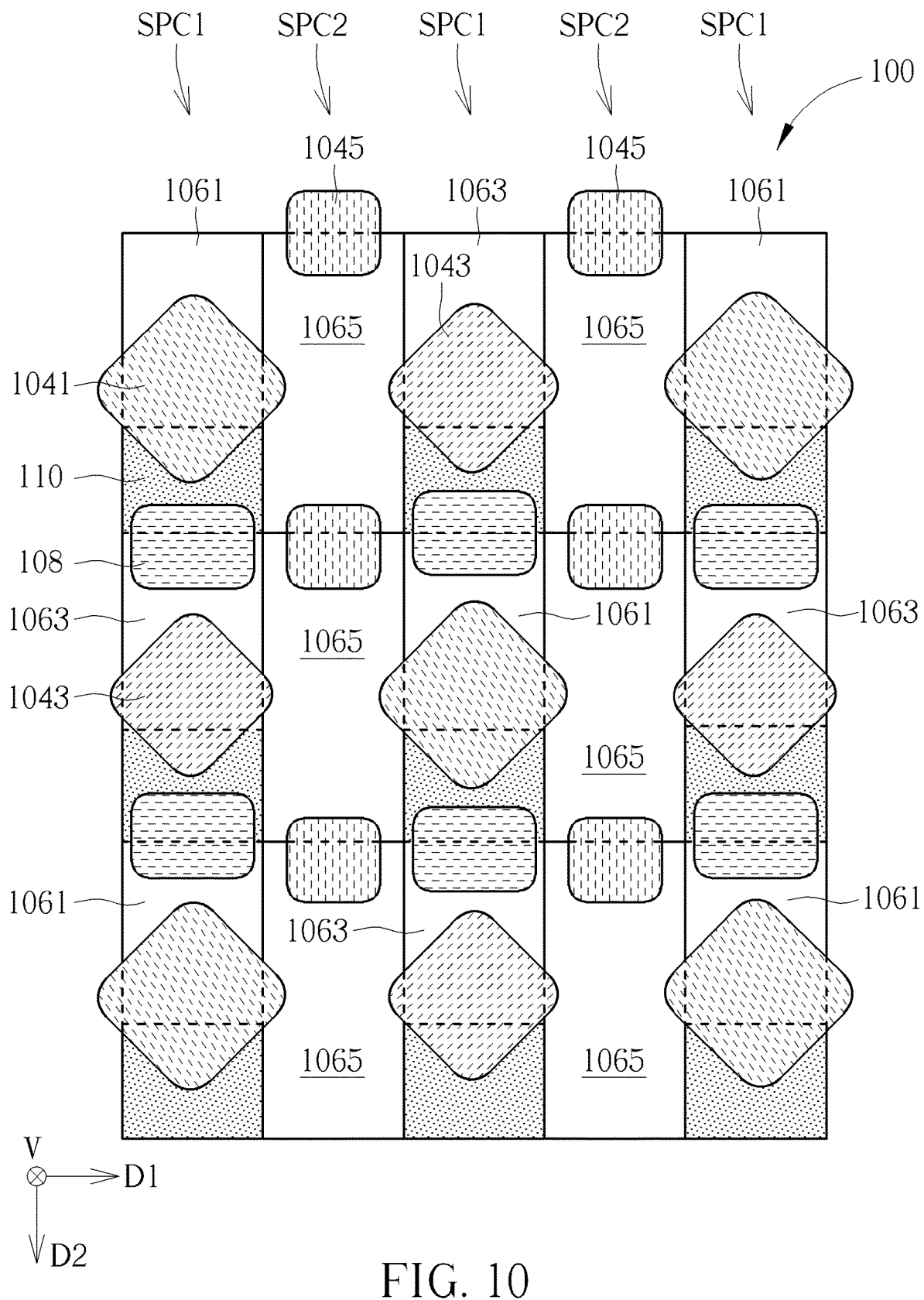
FIG. 10 is a schematic diagram illustrating a display device according to a seventh embodiment of the present disclosure.

Referring to FIG. 10, it is a schematic diagram illustrating a display device according to a seventh embodiment of the present disclosure. Different from the first embodiment, the display device 100 of this embodiment may include a plurality of sub-pixel columns SPC1 and a plurality of sub-pixel columns SPC2, and the sub-pixel columns SPC1 and the sub-pixel columns SPC2 may be alternately disposed in the first direction D1, but not limited thereto. Each of the sub-pixel columns SPC1 may include a plurality of first light emitting units 1041, a plurality of first pixel circuitries 1061, a plurality of second light emitting units 1043, a plurality of second pixel circuitries 1063, a plurality of fingerprint sensor units 108, and a plurality of fingerprint sensor circuitries 110. In the second direction D2, the first light emitting units 1041 and the second light emitting units 1043 may be alternately disposed, and one of the fingerprint sensor units 108 may be disposed between one of the first light emitting units 1041 and one of the second light emitting units 1043, but not limited thereto. In the first direction D1, the first light emitting units 1041 and the second light emitting units 1043 in the same row may be alternately disposed also. In addition, in the second direction D2, the first pixel circuitries 1061 and the second pixel circuitries 1063 may be alternately disposed, and one of the fingerprint sensor circuitries 110 may be disposed between one of the first pixel circuitries 1061 and one of the second pixel circuitries 1063, but not limited thereto. Each of the first light emitting units 1041 and each of the second light emitting units 1043 respectively may overlap with at least a portion of one of the fingerprint sensor circuitries 110 in the top view direction V, and each of the fingerprint sensor units 108 may overlap with at least a portion of one of the first pixel circuitries 1061 or one of the second pixel circuitries 1063 in the top view direction V, but not limited thereto.

Each of the sub-pixel columns SPC2 may include a plurality of third light emitting units 1045 and a plurality of third pixel circuitries 1065 disposed along the second direction D2. In the first direction D1, one of the third light emitting units 1045 may be disposed between two of the fingerprint sensor units 108, and each of the third pixel circuitries 1065 may be disposed between one of the first pixel circuitries 1061 and one of the second pixel circuitries 1063 and between two of the fingerprint sensor circuitries 110, but not limited thereto. The area of one of the third pixel circuitries 1065 may be greater than the area of one of the first pixel circuitries 1061 and/or the area of one of the second pixel circuitries 1063, but not limited thereto. In this embodiment, the shapes of the third light emitting units 1045 and the fingerprint sensor units 108 may be rectangular (and the edges may have rounded corners), and the shapes of the first light emitting units 1041 and the second light emitting units 1043 may be rhombus (and the edges may have rounded corners), but not limited thereto.

Figure 11:
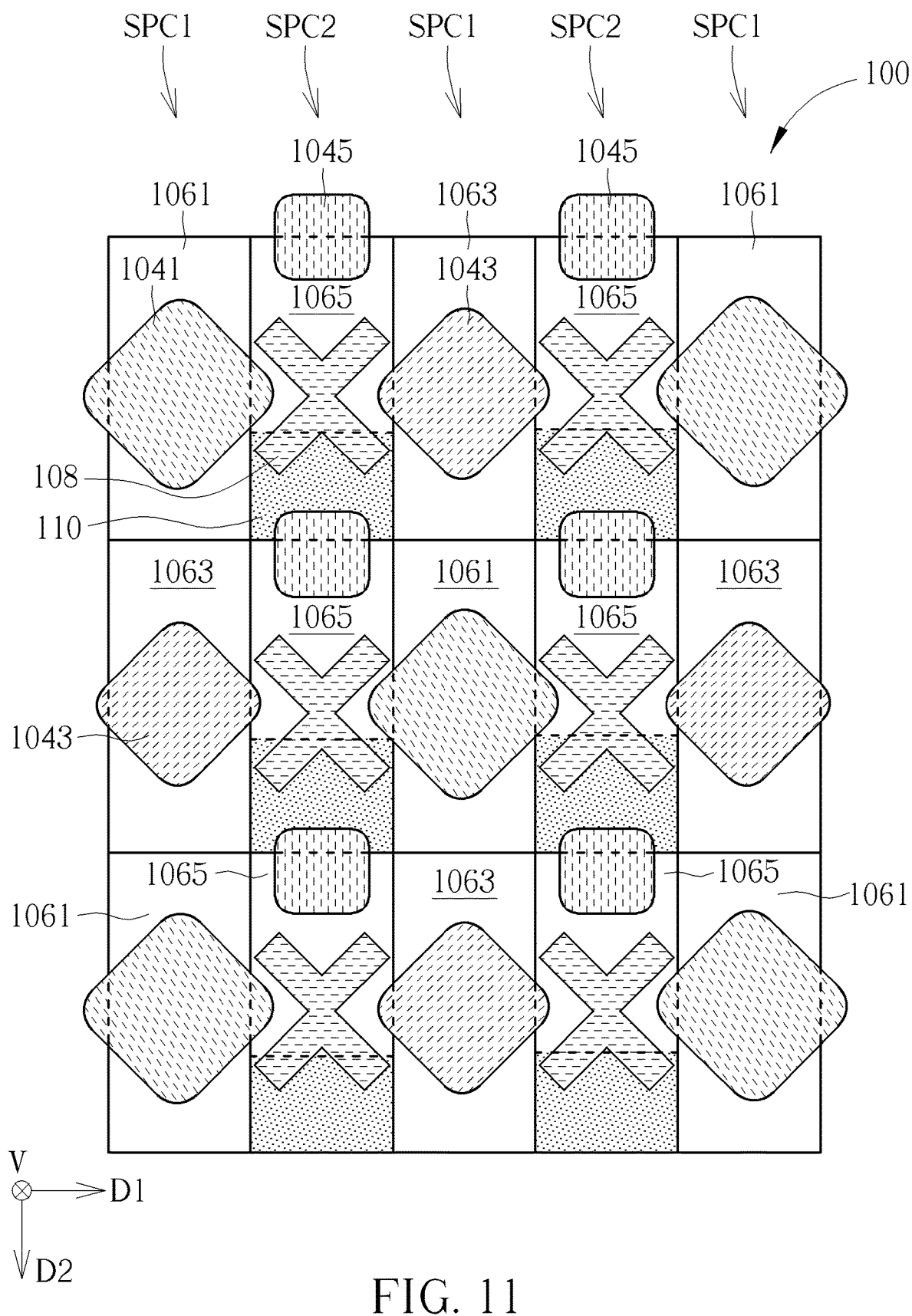
FIG. 11 is a schematic diagram illustrating a display device according to an eighth embodiment of the present disclosure.

Referring to FIG. 11, it is a schematic diagram illustrating a display device according to an eighth embodiment of the present disclosure. Different from the seventh embodiment, the plurality of fingerprint sensor units 108 and the plurality of fingerprint sensor circuitries 110 of this embodiment may be disposed in the sub-pixel columns SPC2. One of the fingerprint sensor units 108 may be disposed between two of the third light emitting units 1045 adjacent to each other ("adjacent" is defined as that no other third light emitting unit exists on the shortest connection line between two third light emitting units) in the second direction D2, and the fingerprint sensor unit 108 may be disposed between one of the first light emitting units 1041 and one of the second light emitting units 1043 in the first direction D1, but not limited thereto. One of the fingerprint sensor circuitries 110 may be disposed between two of the third pixel circuitries 1065 adjacent to each other in the second direction D2, and the fingerprint sensor circuitry 110 may be disposed between one of the first pixel circuitries 1061 and one of the second pixel circuitries 1063 in the first direction D1, but not limited thereto. Therefore, the area of one of the third pixel circuitries 1065 may be less than the area of one of the first pixel circuitries 1061 and/or the area of one of the second pixel circuitries 1063 in this embodiment, but not limited thereto. In addition, one of the third light emitting units 1045 may overlap with at least a portion of one of the fingerprint sensor circuitries 110 in the top view direction V, and one of the fingerprint sensor units 108 may overlap with at least a portion of one of the third pixel circuitries 1065 in the top view direction V, but not limited thereto.

In this embodiment, the shape of the fingerprint sensor unit 108 may be a "X" shape (and the edges may have rounded corners), but not limited thereto. In some variant embodiments of the eighth embodiment, the shape of the fingerprint sensor unit 108 may be a frame shape, and each of the fingerprint sensor units 108 may surround one of the third light emitting units 1045. In addition, each of the fingerprint sensor units 108 may be disposed between one of the third light emitting units 1045 and one of the first light emitting units 1041 adjacent thereto, and between the third light emitting unit 1045 and one of the second light emitting units 1043 adjacent thereto, but not limited thereto. In some variant embodiments of the eighth embodiment, the shape of the fingerprint sensor unit 108 may be the frame shape with rounded corners, but not limited thereto.

Figure 12:
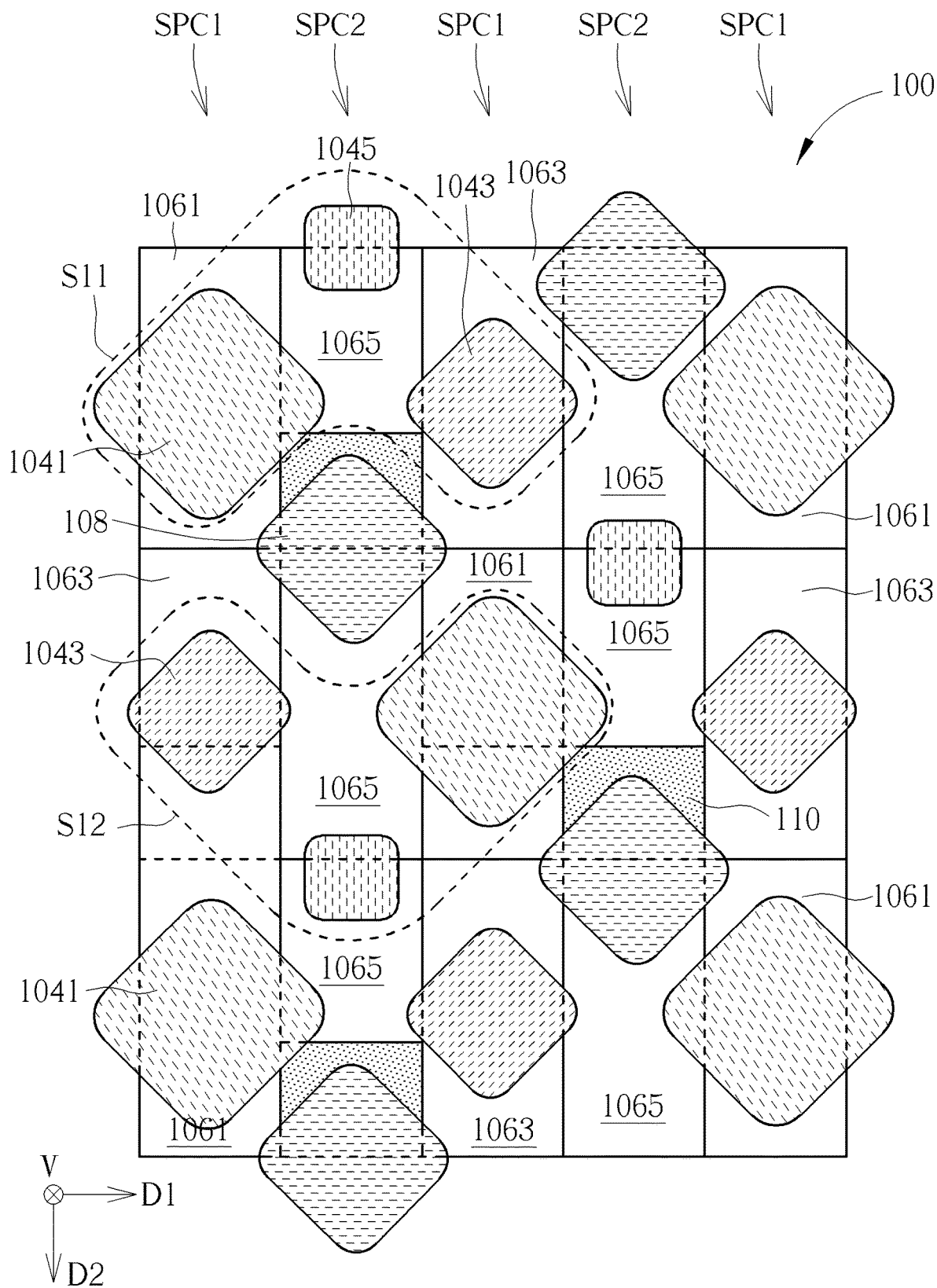
FIG. 12 is a schematic diagram illustrating a display device according to a ninth embodiment of the present disclosure.

Referring to FIG. 12, it is a schematic diagram illustrating a display device according to a ninth embodiment of the present disclosure. Different from the seventh embodiment, the fingerprint sensor units 108 and the fingerprint sensor circuitries 110 of this embodiment may be disposed in the sub-pixel columns SPC2, and the fingerprint sensor units 108 may replace some of the third light emitting units 1045 in the seventh embodiment. For example, one of the fingerprint sensor units 108 may be disposed between two of the first light emitting units 1041 adjacent to each other, two of the second light emitting units 1043 adjacent to each other, and two of the third light emitting units 1045 adjacent to each other. In addition, in the second direction D2, one of the fingerprint sensor units 108 may be disposed between a group S11 of one of the first light emitting units 1041, one of the second light emitting units 1043, and one of the third light emitting units 1045 and another group S12 of one of the first light emitting units 1041, one of the second light emitting units 1043, and one of the third light emitting units 1045. Another difference between this embodiment and the seventh embodiment is that the density of the fingerprint sensor units 108 of this embodiment may be smaller, and the area of the fingerprint sensor unit 108 may be larger, but not limited thereto. In addition, since the fingerprint sensor circuitries 110 of this embodiment may be disposed in the sub-pixel columns SPC2 with the fingerprint sensor units 108, the areas of some of the third pixel circuitries 1065 may be less than the area of the first pixel circuitry 1061 and/or the area of the second pixel circuitry 1063, but not limited thereto.

To sum up, the display device of the present disclosure integrates the fingerprint sensor units and the fingerprint sensor circuitries into the display region by integrating a plurality of fingerprint sensor units and a plurality of fingerprint sensor circuitries into a plurality of pixel units, and therefore the sub-pixels emitting different colors and the fingerprint sensor can be included in one of the pixel units. Under this design, the display device can include the fingerprint sensor units with high density and can provide the fingerprint sensing function having high sensitivity while maintaining the high resolution of the display image. In addition, under this design, the light emitting unit of at least one of the sub-pixels may overlap with at least a portion of the fingerprint sensor circuitry in the top view direction in one pixel unit.

The above description refers to embodiments of the present disclosure, and it is not intended to limit the present disclosure. For those skilled in the art, the present disclosure can be modified or adjusted. As long as the different features between the embodiments do not conflict or depart from the spirit of the present disclosure, they can be rearranged or combined arbitrarily according to the designs. Any modification, equivalent substitution, improvement, etc. made within the spirit or principles of the present disclosure shall be included within the scope of the present disclosure.

What is claimed is:

1. An electronic device, comprising:
   a substrate;
   a first circuitry disposed on the substrate;
   a first light emitting unit disposed on the substrate and driven by the first circuitry;
   a sensor circuitry disposed on the substrate; and
   a sensor unit disposed on the substrate and driven by the sensor circuitry,
   wherein the sensor circuitry comprises a first portion and a second portion, the first portion is different from the second portion, the first portion of the sensor circuitry is overlapped with the first light emitting unit and the second portion of the sensor circuitry is overlapped with the sensor unit in a top view direction of the electronic device.

2. The electronic device according to claim 1, wherein the first portion of the sensor circuitry is overlapped with a portion of a cathode of the first light emitting unit.

3. The electronic device according to claim 1, wherein the first light emitting unit emits a blue light.

4. The electronic device according to claim 1, wherein the first light emitting unit emits a green light.

5. The electronic device according to claim 1, further comprising a second light emitting unit disposed on the substrate, wherein a third portion of the sensor circuitry is overlapped with the second light emitting device in the top view direction of the electronic device.

6. The electronic device according to claim 5, wherein the third portion of the sensor circuitry is overlapped with a portion of a cathode of the second light emitting unit.

7. The electronic device according to claim 5, wherein the first light emitting unit and the second light emitting unit emit different color lights.

8. The electronic device according to claim 7, wherein the first light emitting unit emits a blue light, and the second light emitting unit emits a red light.

9. The electronic device according to claim 7, wherein the first light emitting unit emits a blue light, and the second light emitting unit emits a green light.

10. The electronic device according to claim 5, wherein an area of the first light emitting unit is greater than an area of the second light emitting unit.

11. The electronic device according to claim 1, wherein the sensor unit comprises a photoelectric conversion element, a capacitor or a pressure sensing element.

* * * * *